(12) United States Patent
Okabe (10) Patent No.: US 7,139,104 B2
(45) Date of Patent: Nov. 21, 2006

(54) DOWNSIZED FACSIMILE MACHINE USING SEMICONDUCTOR DAA

(75) Inventor: Shouji Okabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1010 days.

(21) Appl. No.: 10/212,540

(22) Filed: Aug. 5, 2002

(65) Prior Publication Data

US 2003/0048483 A1 Mar. 13, 2003

(30) Foreign Application Priority Data

Aug. 6, 2001 (JP) .............................. 2001-238212

(51) Int. Cl.
*H04N 1/00* (2006.01)
*H04M 1/00* (2006.01)
*H04M 11/00* (2006.01)

(52) U.S. Cl. ...................... 358/400; 358/436; 379/412; 379/93.05

(58) Field of Classification Search ................ 358/400, 358/436, 437; 379/412, 93.05
See application file for complete search history.

(56) References Cited

U.S. PATENT DOCUMENTS

| | | | |
|---|---|---|---|
| 4,086,443 A * | 4/1978 | Gorham et al. | ........ 379/100.14 |
| 5,758,040 A | 5/1998 | Ichimura et al. | |
| 6,128,104 A | 10/2000 | Okabe et al. | |
| 6,128,373 A | 10/2000 | Mathe et al. | |
| 6,647,101 B1 * | 11/2003 | Rahamim et al. | ........ 379/93.05 |
| 6,799,225 B1 * | 9/2004 | Sands et al. | .................... 710/5 |
| 6,851,042 B1 * | 2/2005 | Murray | ........................ 712/32 |
| 6,895,085 B1 * | 5/2005 | Gonikberg | ............... 379/93.28 |
| 7,016,490 B1 * | 3/2006 | Beutler et al. | .............. 379/412 |
| 2002/0126806 A1 * | 9/2002 | Rahamim et al. | ........ 379/93.05 |
| 2004/0100854 A1 * | 5/2004 | Rahamim et al. | ........... 365/232 |

FOREIGN PATENT DOCUMENTS

| | | |
|---|---|---|
| EP | 0531217 | 3/1993 |
| JP | 5122428 | 5/1993 |
| JP | 8139886 | 5/1996 |
| WO | WO9857476 | 12/1998 |

OTHER PUBLICATIONS

Pending Claims and drawings of U.S. Appl. No. 09/677,790, filed Oct. 2, 2000.
Pending Claims and drawings of U.S. Appl. No. 09/675,100, filed Sep. 28, 2000.
Siliconlabs News Release "Silicon Laboratories Announces Revolutionary Silicon DAA" News Mar. 17, 1998, XP002221574.
ST Microelectronics "DAA Line Interface" Data Sheet, Dec. 1998, XP002221575.

* cited by examiner

*Primary Examiner*—Jerome Grant, II
*Assistant Examiner*—Houshang Safaipour
(74) *Attorney, Agent, or Firm*—Cooper & Dunham LLP (57) ABSTRACT

A facsimile machine having a semiconductor DAA provided in a line I/F part performing facsimile data communication with a network includes a tone signal reception part in the form of a semiconductor device. The tone signal reception part is provided in the semiconductor DAA and receives a tone signal with high impedance through a path different from a path for receiving the facsimile data. The tone signal is supplied from the network or a downstream device.

17 Claims, 8 Drawing Sheets

DOWNSIZED FACSIMILE MACHINE USING SEMICONDUCTOR DAA

BACKGROUND OF THE INVENTION

1. Field of the Invention

The present invention generally relates to facsimile machines, and more particularly to a facsimile machine including a data access arrangement (DAA) in the form of a semiconductor device (hereinafter referred to as a semiconductor DAA) and having an automatic switching function from telephone to facsimile (hereinafter also referred to as TEL→FAX) based on detection of a calling tone signal. (CNG signal), a facsimile communication network service function based on detection of a facsimile communication network signal (FCC signal), and a TEL→FAX remote switching function based on detection of a dual tone multi-frequency signal (DTMF signal).

2. Description of the Related Art

The conventional facsimile machine as disclosed in Japanese Laid-Open Patent Application No. 5-122428 or No. 8-139886, in order to establish interface (I/F) with a telephone line (line I/F), employs two transformers: one terminated by 600 Ω for impedance consistency between a FAX modem and the telephone line and for insulation between an integrated circuit on the network side and an integrated circuit on the modem side, and the other terminated by high impedance for transmission and insulation between the integrated circuit on the network side and the integrated circuit on the modem side with respect to the CNG signal, the FCC signal, and the DTMF signal that are tone signals.

On the other hand, recently, the semiconductor DAA, which realizes the analog circuit of the line I/F in the form of a semiconductor device without using transformers, has been used as an interface for a data modem, thus realizing circuit simplification and reduction in circuit size and cost.

Figure 1:
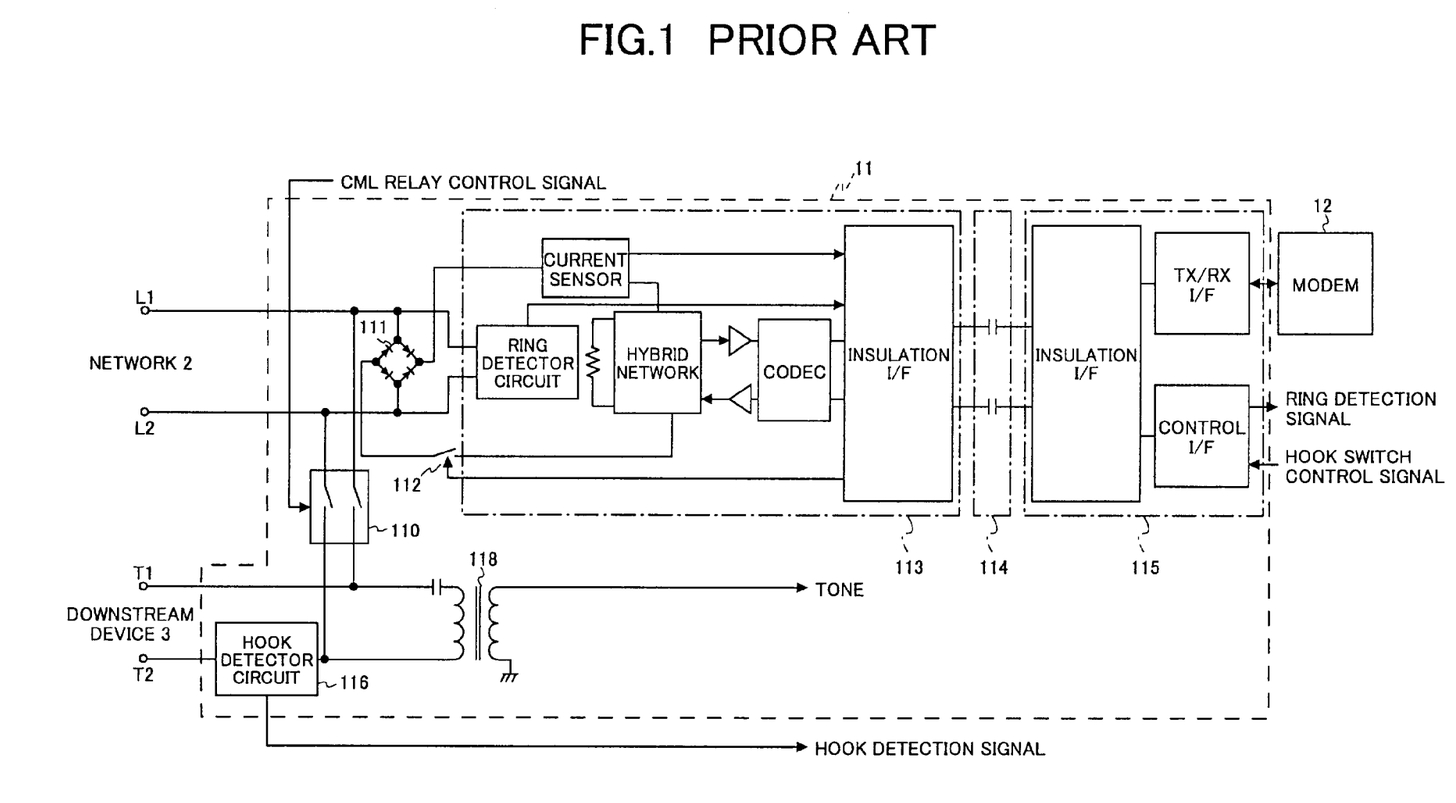
FIG. 1 is a diagram showing the configuration of a facsimile machine using a conventional DAA in the form of a semiconductor device.

The semiconductor DAA (hereinafter referred to as a silicon DAA) may be used in a facsimile machine as shown in FIG. 1. In FIG. 1, a line I/F part 11 is established between a network 2 and a modem 12. The line I/F part 11 includes the silicon DAA, that is, an integrated circuit 113 on the network side, a reception and transmission part 114, and an integrated circuit 115 on the modem and main control part side. The line I/F part 11 further includes a CML (Connect MODEM to Line) relay 110, a diode bridge (full-wave rectifier circuit) 111, a hook switch 112, and a hook detector circuit 116.

In the case of using the silicon DAA in the facsimile machine, it is additionally required to perform-detection of the CNG signal as the TEL→FAX automatic switching function, detection of the FCC signal as a call signal in the FAX communication network service, and detection of the DTMF signal as the TEL→FAX remote switching function. The silicon DAA, however, does not include a part receiving and transmitting these tone signals. Therefore, it is required, as conventionally, to provide a transformer 118 terminated by high impedance outside the silicon DAA.

SUMMARY OF THE INVENTION

Accordingly, it is a general object of the present invention to provide a facsimile machine in which the above-described disadvantage is eliminated.

A more specific object of the present invention is to provide a facsimile machine that uses a silicon DAA in a line I/F part for detecting a CNG signal indicating TEL→FAX automatic switching, an FCC signal as the call signal of the facsimile communication network service, and a DTMF signal for TEL→FAX remote switching instead of using a transformer terminated by high impedance for detecting those signals, thereby realizing simplicity in configuration, downsizing, and cost reduction.

The above objects of the present invention are achieved by a facsimile machine having a semiconductor DAA provided in a line I/F part performing facsimile data communication with a network, the facsimile machine including a tone signal reception part in the form of a semiconductor device, the tone signal reception part being provided in the semiconductor DAA and receiving a tone signal with high impedance through a path different from a path for receiving the facsimile data, the tone signal being supplied from the network or a downstream device.

According to the above-described facsimile machine, the semiconductor DAA includes the tone signal reception part that does not use a transformer to detect the tone signal. Therefore, the facsimile machine of the present invention can be reduced in size and cost.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

In FIGS. 2 through 8, the same elements as those of FIG. 1 are referred to by the same numerals.

Figure 2:
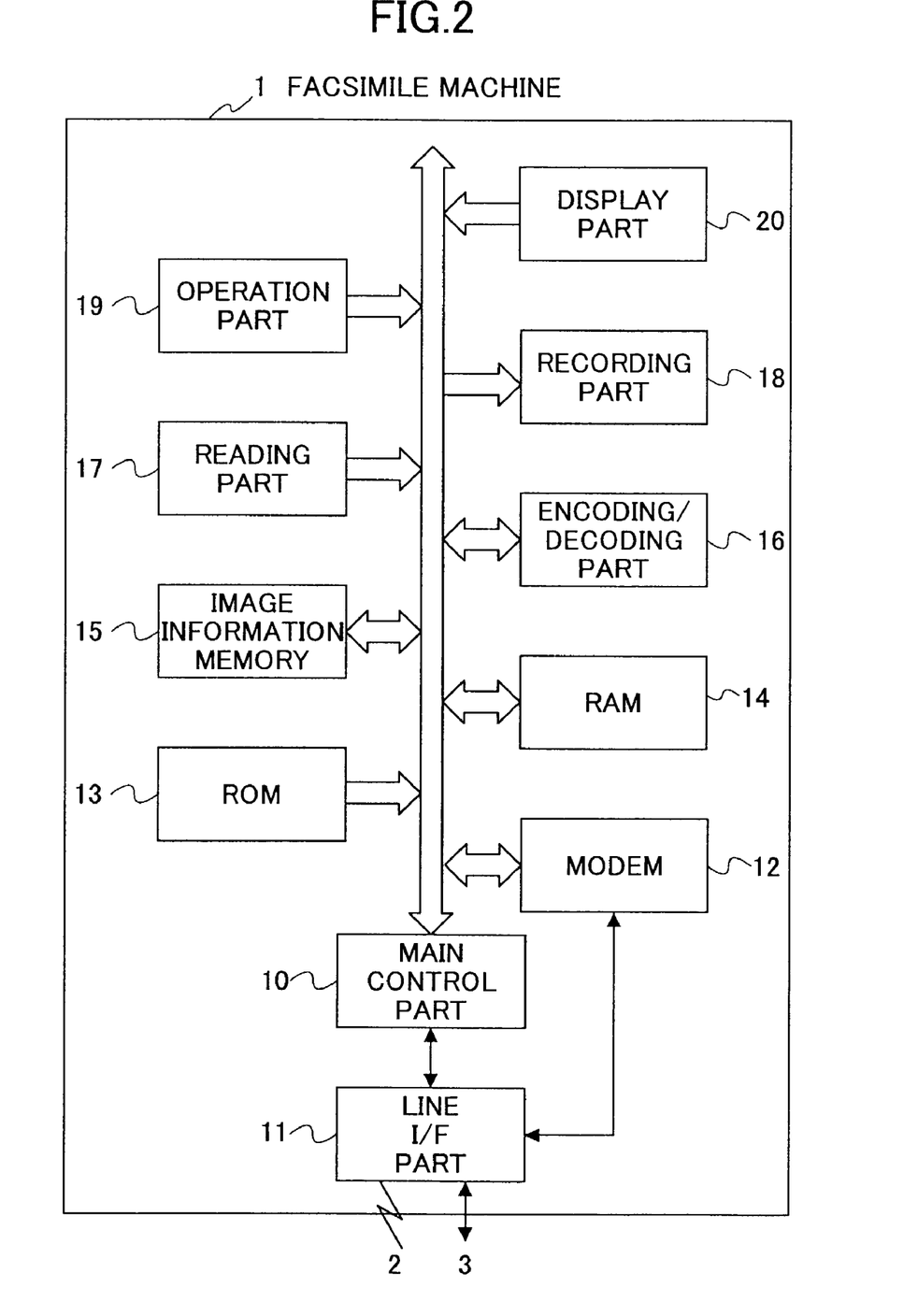
FIG. 2 is a block diagram showing the entire configuration of a facsimile machine according to the present invention.

FIG. 2 is a block diagram showing the overall structure of a facsimile machine 1 according to the present invention. The facsimile machine 1 includes a main control part 10, the line I/F part 11, the modem 12, a ROM 13, a RAM 14, an image information memory 15, an encoding and decoding part 16, a reading part 17, a recording part 18, an operation part 19, and a display part 20.

The main control part 10 controls the entire facsimile machine 1 in accordance with a variety of control programs recorded in the ROM 13. The main control part 10 controls the line I/F part 11 related directly to the present invention. The RAM 14 includes a variety of necessary data and a work area for controlling the entire facsimile machine 1. The image information memory 15 stores received image information and image information to be transmitted. The encoding and decoding part 16 compresses the image information to be transmitted in accordance with a given encoding method such as the MH (Modified Huffman), MR (Modified Read), or MMR (Modified Modified Read) encoding method, and expands the received image information in accordance with a given decoding method such as the MH, MR, or MMR decoding method. The reading part 17 converts an original to be transmitted into image data in accordance with the line density of the original. The recording part 18 prints the received image information on a sheet of paper in accordance with a given line density such as 3.85 lines/mm, 7.7 lines/mm, or 15.4 lines/mm and outputs the printed image information. The operation part 19 includes a numeric keypad as dial keys, a start/stop key as an operation signal, and function keys for executing a variety of operations. Information on the keys is displayed and confirmed on the display part 20 including display devices such as a liquid crystal and LEDs.

The modem 12 modulates data to be transmitted via the line I/F part 11 to the network 2, and demodulates data received via the line I/F part 11 from the network 2. Further, the modem 12 includes tone detectors that detect, by internal digital filters, a variety of tone signals such as a CNG signal, an FCC signal, and a DTMF signal supplied from the line I/F part 11. When a call is transmitted or received, the main control part 10 performs given control of the network 2 mainly through controlling a variety of switches of the line I/F part 11. Further, a downstream device 3 such as an external telephone or a TAM (telephone answering machine) is connected to the line I/F part 11. The line I/F part 11 corresponds to the silicon DAA of the present invention.

Next, a brief description will be given, with reference to FIG. 2, of the TEL→FAX automatic switching function, the facsimile communication network service function, and the TEL→FAX remote switching function of the facsimile machine 1 of the present invention.

The TEL→FAX automatic switching function is switched ON when a user selects an automatic switching mode as the reception mode by the operation part 19. With the TEL→FAX automatic switching function being ON, when a ringing signal arrives from the network 2, the downstream device 3 responds prior to the facsimile machine 1. At this point, if the arriving communication is a telephone call, the facsimile machine 1 makes no response. However, if the arriving communication is facsimile transmission, the facsimile machine 1 automatically detects the CNG signal of 1100 Hz characteristic of facsimile transmission through the line I/F part 11 so as to switch the reception mode to facsimile communication (a facsimile mode).

The facsimile communication network service function is one of the services provided by public telephone companies With this function, when a call arrives from a facsimile communication network, the facsimile machine 1 can detect the FCC signal of 1300 Hz (no-ringing call signal) arriving via the line I/F part 11 from the network 2, thereby instantaneously determining that the call is facsimile communication.

The TEL→FAX remote switching function is switched ON when the user selects a telephone mode as the reception mode by the operation part 19. With the TEL→FAX remote switching function being ON, when a ringing signal arrives from the network 2, only the downstream device 3 responds. When the receiver answers and thereafter it is determined from a monitoring sound from the network 2 that the arriving communication is a facsimile transmission, a given number of DTMF signals corresponding to a remote number are generated by dialing in order to switch the reception mode from the telephone mode to the facsimile mode. The facsimile machine 1 detects the DTMF signals through the line I/F part 11, thereby switching the reception mode from the telephone mode to the facsimile mode.

Figure 3:
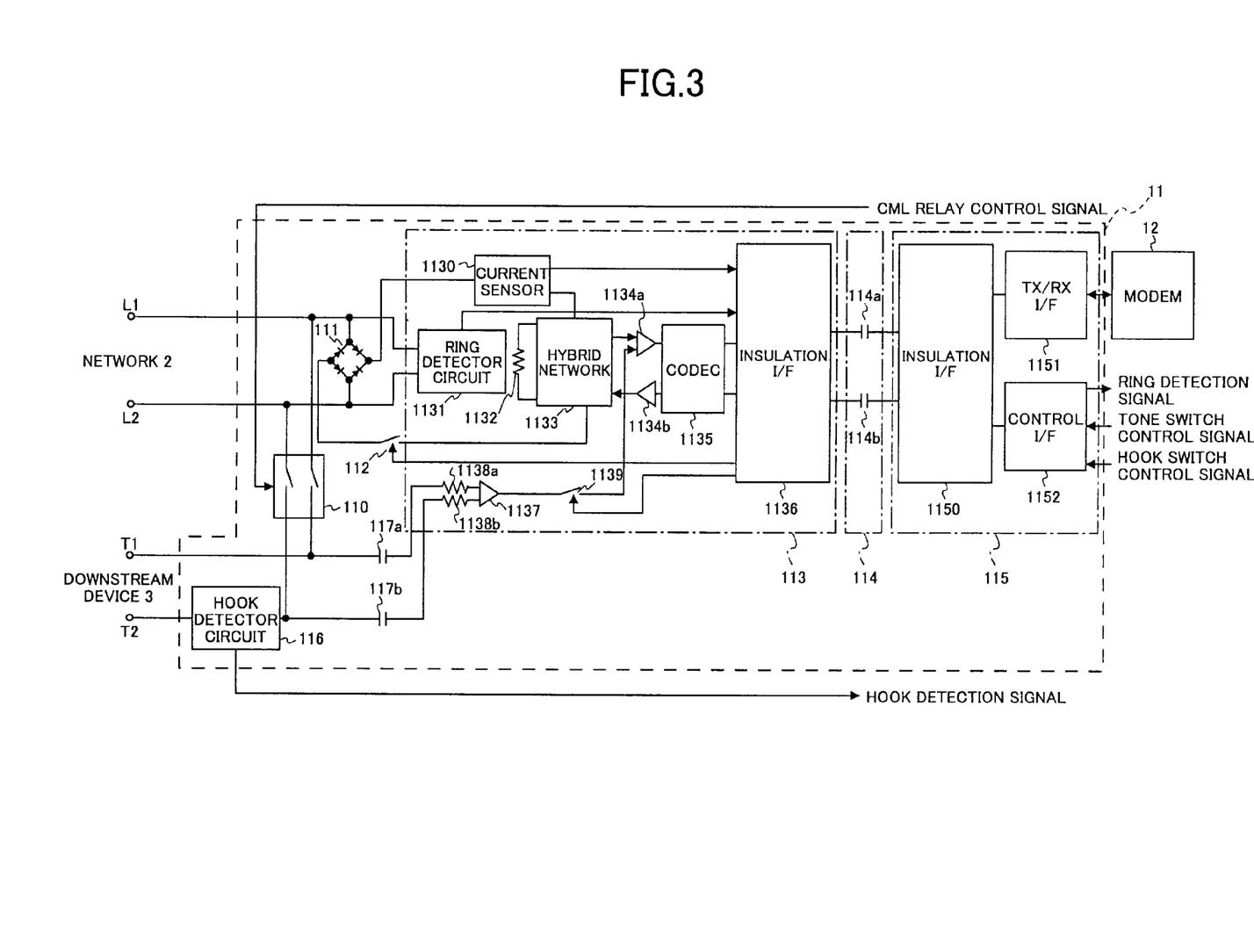
FIG. 3 is a diagram showing the configuration of a line I/F part of a facsimile machine in which one type of semiconductor DAA according to the present invention is used.
Figure 4:
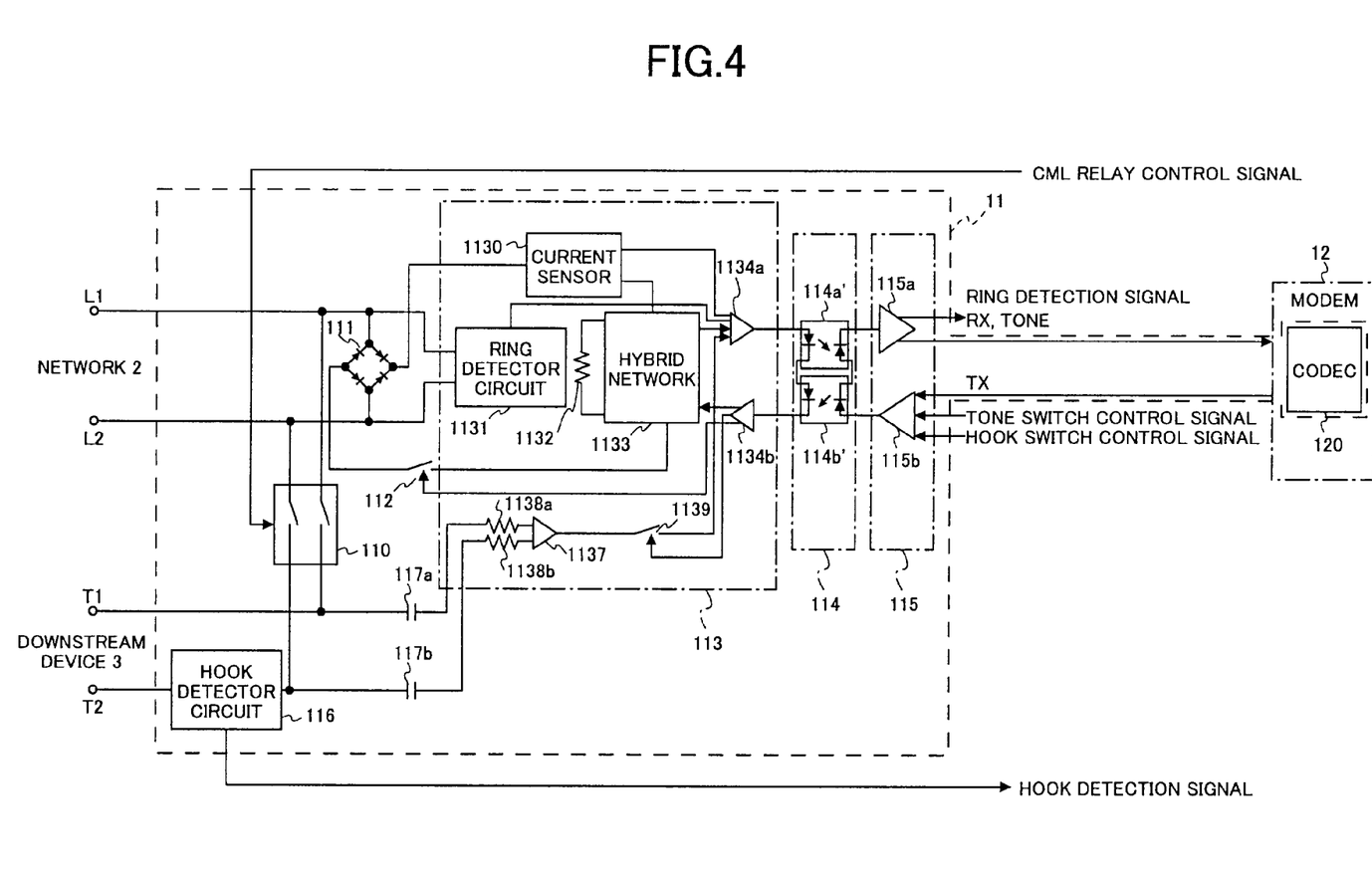
FIG. 4 is a diagram showing the configuration of the line I/F part of the facsimile machine in which another type of semiconductor DAA according to the present invention is used.

FIGS. 3 and 4 are block diagrams showing configurations of the line I/F part 11 using the silicon DAA of the present invention. The silicon DAA has main functions such as insulation between the line end or the line side and the modem side, hybrid networking, and ringing detection. The silicon DAA is composed of three parts: the integrated circuit 113 on the network (2) side, the integrated circuit 115 on the modem (12) and main control part (10) side, and the reception and transmission part 114, which is an insulator part providing direct current insulation and communicating data and signals between the integrated circuits 113 and 115.

In addition to the silicon DAA, the line I/F part 11 includes the CML relay 110 for TEL→FAX switching, the diode bridge (full-wave rectifier circuit) 111, the hook switch 112, the hook detector circuit 116, and capacitors 117a and 117b for cutting DC loop. The line I/F part 11 is connected via terminals L1 and L2 to the network 2 and via terminals T1 and T2 to the downstream device 3.

The silicon DAA is of either one of two types. That is, the silicon DAA may have a CODEC (coder-decoder) performing analog-to-digital (A/D) conversion and digital-to-analog (D/A) conversion on facsimile data provided in the modem 12 or the integrated circuit 115 on the modem and main controller side, or in the integrated circuit 113 on the network side.

In FIG. 3, a CODEC 1135 is provided in the integrated circuit 113 on the network side, and generally, a capacitor of high insulation is employed for the insulation part 114 of digital communication. On the other hand, in FIG. 4, a CODEC 120 is provided in the modem 2 (or in the integrated circuit 115 on the modem and main control part side), and generally, a high-insulation device such as an analog photocoupler is employed for the insulation part 114 of analog communication.

The following description is given of the case of FIG. 3, where the CODEC 1135 is provided in the integrated circuit 113 on the network side.

In FIG. 3, in a wait state, the CML relay 110 is switched ON to the downstream device 3 such as a telephone Once facsimile communication starts, the main control part 10 switches a CML relay control signal OFF so that the network 2 is detached from the downstream device 3. The diode bridge 111 sets the polarity of the DC loop current of the network 2 to one direction. A highly pressure-resistant MOSFET is used for the hook switch 112, which sets the modem 12 in an off-hook condition.

When facsimile communication is started, a hook switch control signal is generated from the main control part 10 to be supplied to the hook switch 112 through a control I/F 1152 of the integrated circuit 115, an insulation I/F 1150, the capacitor 114b of the insulation part 114, and an insulation I/F 1136 of the integrated circuit 113, controlling the hook switch 112 to an ON state. The hook detector circuit 116 detects the off-hook of the downstream device 3. When the downstream device 3 is set in an off-hook state, the DC loop current flows through the hook detector circuit 116, so that a hook detection signal switches from H (high level) to L (low level). Thereby, the off-hook of the downstream device 3 is detected in the main control part 10.

Next, a description will be given of the integrated circuit 113 on the network side. Power for the integrated circuit 113 is supplied from the network 2 and is rectified by the diode bridge 111 into a voltage of a constant polarity irrespective of the voltage polarity of the network 2. When facsimile communication is started, the off-hook state is determined based on whether the DC loop current flows through a current sensor 1130. When a ringing signal from the network 2 reaches a ring detector circuit 1131, a ring detection signal is output therefrom, switched between H and L in the same cycle. The output ring detection signal is supplied to the main control part 10 via the insulation I/F 1136, the capacitor 104a of the insulation part 114, the insulation I/F 1150, and the control I/F 1152. Thereby, the ring detection signal is detected by the main control part 10.

A terminal resistor 1132 determines the terminal impedance of the network 2. The specifications of the terminal resistor 1132 depend on the communication standards of each country. A hybrid network 1133 includes a two-to-four line converter circuit that separates facsimile data into transmission and reception data (data to be transmitted and data received), a canceller circuit that prevents the transmission data from passing through a reception path, and a filter circuit. A reception amplifier 1134a and a transmission amplifier 1134b perform gain adjustment on the reception and transmission data, respectively. The CODEC 1135 performs A/D conversion and D/A conversion on the reception data and the transmission data, respectively.

The insulation I/F 1136 of the integrated circuit 113 on the network side integrates a hook signal supplied from the current sensor 1130, the ring detection signal supplied from the ring detector circuit 1131, and the facsimile reception data supplied from the CODEC 1135 into serial data supplied to the capacitor 114a of the insulation part 114. Further, the insulation I/F 1136 separates a serial signal supplied from the capacitor 114b of the insulation part 114 into the hook switch control signal supplied to the hook switch 112, a tone switch control signal supplied to a tone switch 1139, and the facsimile transmission data supplied to the CODEC 1135.

Resistors 1138a and 1138b each have a high resistance so that impedance is high with respect to the network 2 and the downstream device 3. A tone amplifier 1137 is a differential amplifier whose inputs are connected via the resistors 1138a and 1138b with the terminals L1 and L2 of the network 2 or the terminals T1 and T2 of the downstream device 3 and produces an output signal that is a function of the difference between the inputs. The tone amplifier 1137 and the resistors 1138a and 1138b form a tone signal reception part.

The tone switch 1139, which is ON except for during facsimile communication, is switched OFF immediately when facsimile communication is started so as to block noise that may come from the downstream device 3 via the tone amplifier 1137 during facsimile communication. ON-OFF control of the tone switch 1139 is performed by the tone switch control signal supplied from the main control part 10 to the tone switch 1139 via the control I/F 1152, the insulation I/F 1150, the capacitor 114b of the insulation part 114, and the insulation I/F 1136. The output of the tone amplifier 1137 is additionally input to the reception amplifier 1134a via the tone switch 1139.

As described above, the silicon DAA of the present invention receives the tone signal supplied from the network 2 or the downstream device 3 with high impedance by using a path different from the facsimile data reception path such as the hybrid network 1133, that is, by using the tone signal reception part (the tone amplifier 1137 and the resistors 1138a and 1138b) that is realized as a semiconductor device without using a transformer. Therefore, the facsimile machine 1 using the silicon DAA of the present invention can be reduced in size and cost.

Further, the silicon DAA of the present invention includes the integrated circuit 113 on the network side, the integrated circuit 115 on the modem and main control part side, and the insulation part 114 coupling the integrated circuits 113 and 115, and has the tone signal reception part (the tone amplifier 1137 and the resistors 1138a and 1138b) provided in the integrated circuit 113 on the network side. Therefore, the tone signal received in the tone signal reception part can be transmitted to the integrated circuit 115 on the modem and main control part side via the coupling insulation part 114.

Next, a description will be given of the integrated circuit 115 on the modem side. Power is supplied from the main body of the facsimile machine 1 to the integrated circuit 115. The insulation I/F 1150 of the integrated circuit 115 on the modem side has the function opposite to that of the insulation I/F 1136 of the integrated circuit 113 on the network side. That is, the insulation I/F 1150 separates the output signal of the capacitor 114a of the insulation part 114 into the facsimile reception data to a TX/RX I/F 1151 and the detection signals to the control I/F 1152, and integrates the facsimile transmission data supplied from the TX/RX I/F 1151 and the control signals supplied from the control I/F 1152 into a signal supplied to the capacitor 114b of the insulation part 114. The TX/RX I/F 1151 functions as interface with the modem 12 for the facsimile data, and the control I/F 1152 functions as interface with the main control part 10. The tone signals of the CNG signal and the FCC signal are detected by the tone detector formed of a digital filter provided in the modem 12, and the DTMF signal is detected by the DTMF detector formed of a digital filter provided in the modem 12.

A description will be given, with reference to FIGS. 5 through 8, of the flow of signals especially in the line I/F 11 of the facsimile machine 1 having the above-described configuration.

Figure 5:
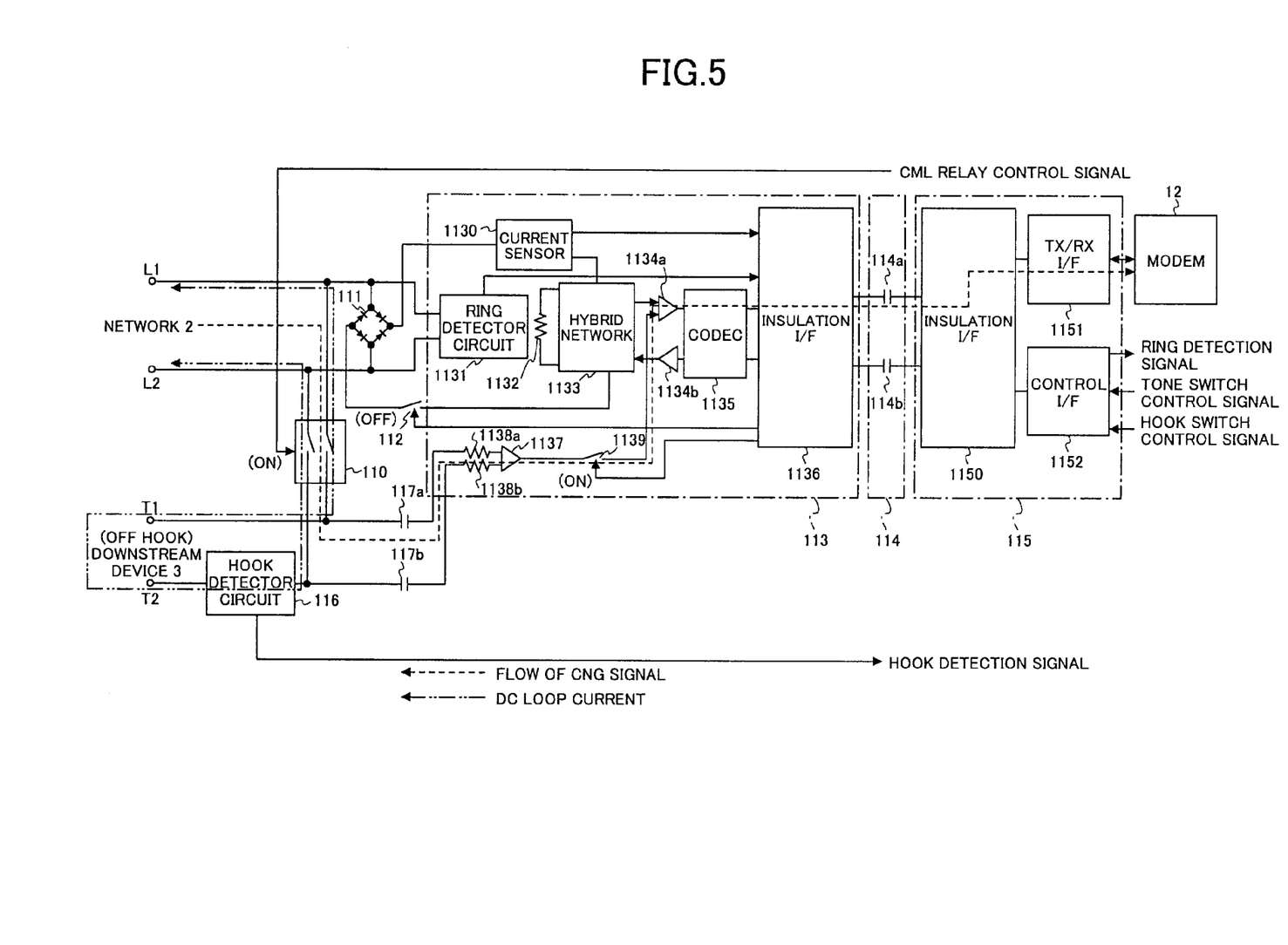
FIG. 5 is a diagram showing a path through which a CNG signal is received according to the present invention.

First, in FIG. 5, at the time of receiving the CNG signal when the TEL→FAX automatic switching function is started, the CML relay 110 is ON, the hook switch 112 is OFF, the tone switch 1139 is ON, and the downstream device 3 is in the off-hook state. At this point, when the CNG signal arrives from the network 2, the CNG signal flows to the modem 12 through the CML relay 110, the capacitors 117a and 117b, the resistors 1138a and 1138b, the tone amplifier 1137, the tone switch 1139, the reception amplifier 1134a, the CODEC 1135, the insulation I/F 1136, the capacitor 114a of the insulation part 114, the insulation I/F 1150, and the TX/RX I/F 1151 as indicated by the broken arrow in the drawing. The double-dot chain line arrow indicates the path of the DC loop current.

The CNG signal transmitted to the modem 12 has its characteristic frequency of 1100 Hz detected by the digital filter provided in the modem 12. Thereby, the arrival of the CNG signal is recognized. By detecting the arrival of the CNG signal, the CML relay 110 is switched OFF by the CML relay control signal, the hook switch 112 is switched ON by the hook switch control signal, and the tone switch 1139 is switched OFF by the tone switch control signal. Thereby, the facsimile data transmitted from the network 2 can be received.

Figure 6:
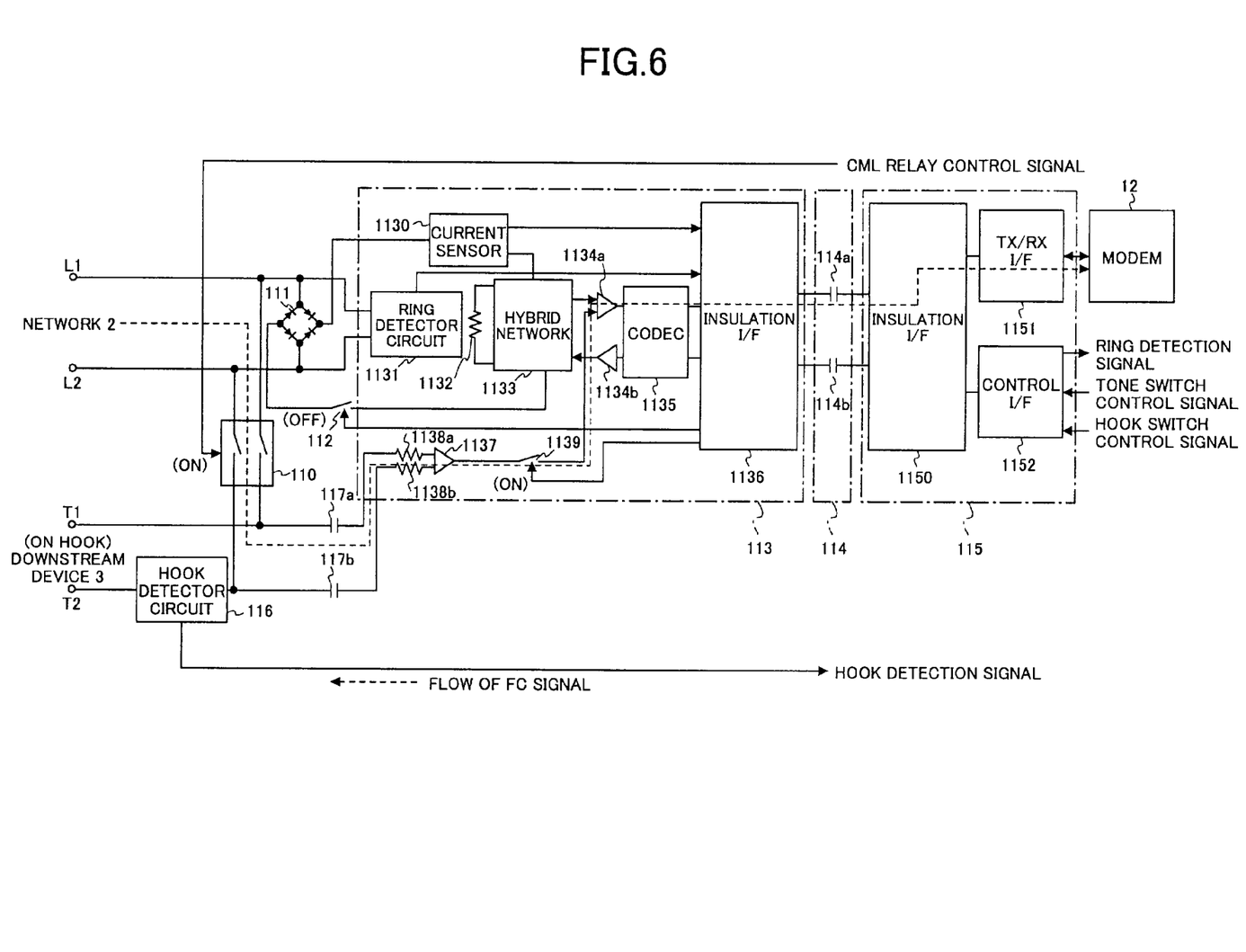
FIG. 6 is a diagram showing a path through which an FCC signal is received according to the present invention.

Next, in FIG. 6, at the time of receiving the FCC signal as the call signal of the facsimile communication network service, the CML relay 110 is ON, the hook switch 112 is OFF, the tone switch 1139 is ON, and the downstream device 3 is in an on-hook wait state. The flow of the FCC signal at this time is the same as that of the CNG signal as indicated by the broken arrow in the drawing. The FCC signal transmitted to the modem 12 has its characteristic frequency of 1300 Hz detected by the digital filter provided in the modem 12, and similarly, the CML relay 110 is switched OFF, the hook switch 112 is switched ON, and the tone switch 1139 is switched OFF. Thereby, the facsimile data transmitted from the network 2 can be received.

Figure 7:
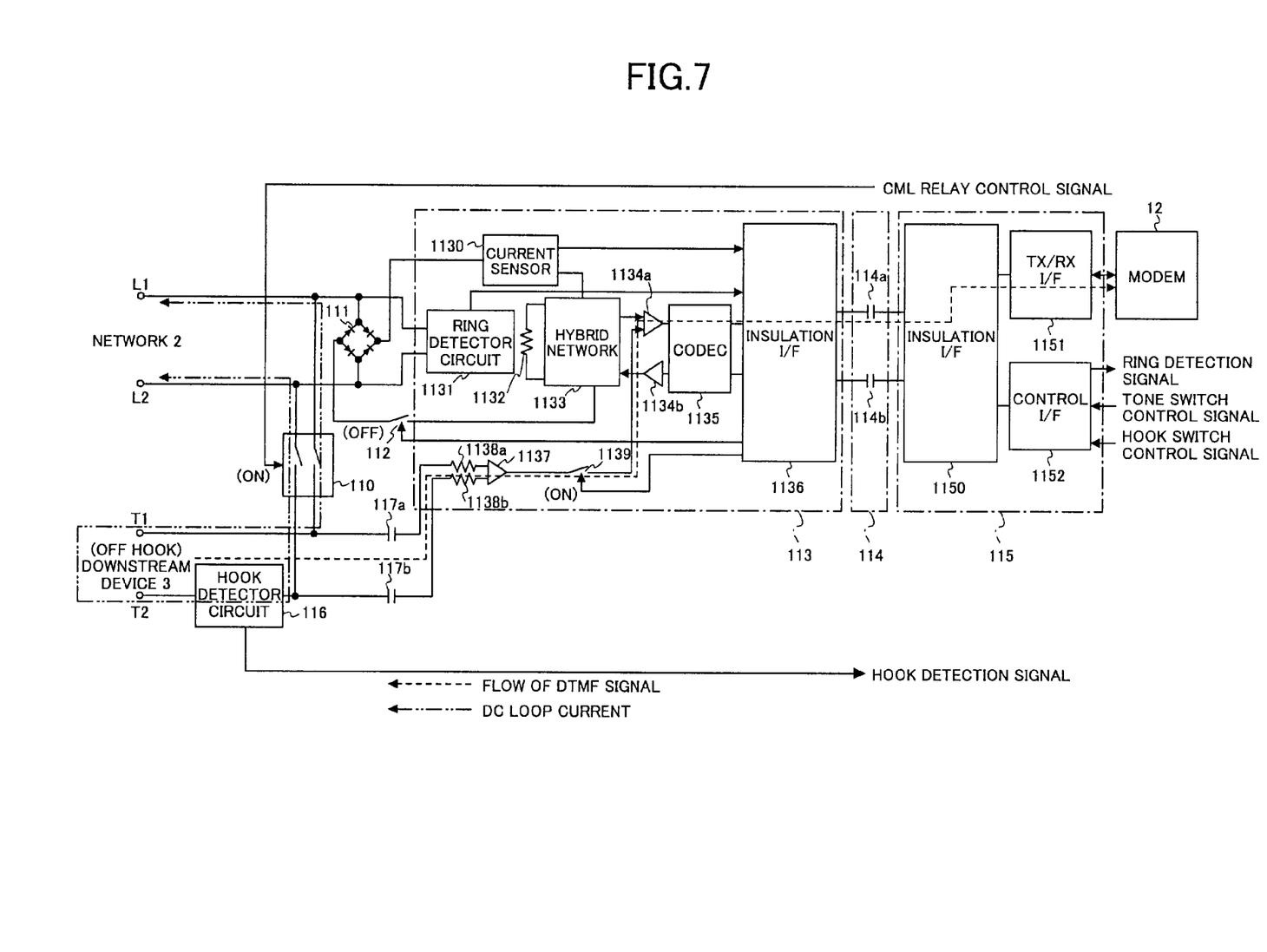
FIG. 7 is a diagram showing a path through which a DTMF signal is received according to the present invention.

Next, in FIG. 7, at the time of receiving the DTMF signal as a remote number when the TEL→FAX remote switching function is in operation, the CML relay 110 is ON, the hook switch 112 is OFF, the tone switch 1139 is ON, and the downstream device 3 is in the off-hook state. At this point, the DTMF signal arriving from the downstream device 3 (for instance, an external telephone) is supplied to the modem 12 through the hook detector circuit 116, the capacitors 117a and 117b, the resistors 1138a and 1138b, the tone amplifier 1137, the tone switch 1139, the reception amplifier 1134a, the CODEC 1135, the insulation I/F 1136, the capacitor 114a of the insulation part 114, the insulation I/F 1150, and the TX/RX I/F 1151 as indicated by the broken arrow in the drawing. The double-dot chain line arrow indicates the path of the DC loop current.

The DTMF signal transmitted to the modem 12 has its combinations of specific frequencies identified by the digital filter provided in the modem 12, so that the DTMF signal is detected. Thereby, as in the case of the CNG signal, the CML relay 110 is switched OFF, the hook switch 112 is switched ON, and the tone switch 1139 is switched OFF, so that the facsimile data transmitted from the network 2 can be received.

As described above, in the silicon DAA that does not use a transformer, a high-impedance CNG signal reception part as an automatic switching function from telephone to facsimile, a high-impedance FCC signal reception part receiving the FCC signal as the call signal of the facsimile communication network service, and a high-impedance DTMF signal reception part as the remote switching function from telephone to facsimile are formed by the common tone signal reception part (the tone amplifier 1137 and the resistors 1138a and 1138b), which part is provided as a path different from the facsimile data reception path. Therefore, each tone signal can be detected securely, and the facsimile machine 1 of the present invention can be reduced in size and cost.

Further, each of the CNG signal, the FCC signal, and the DTMF signal received by the tone signal reception part is transmitted to the circuit part on the modem and main control part side via a transmission line of the capacitor 114a of the insulation part 114, which transmission line is also used for the facsimile data. Therefore, the configuration of the insulation part 114 can be simplified. Further, in addition to the insulation part 114, the reception amplifier 1134a, the CODEC 1135, and the insulation I/F 1136 can be also used for the facsimile data. Therefore, the configuration of the facsimile machine 1 can be simplified.

Furthermore, the tone switch 1139 for switching ON and OFF the tone signal path of the tone signal reception part is provided, for instance, on the output side of the tone amplifier 1137. Therefore, noise coming from the tone signal reception part can be blocked while the facsimile data is received, so that the facsimile communication performance can be maintained.

Moreover, the control signals to the control parts provided in the silicon DAA, such as the tone switch control signal for switching ON and OFF the tone signal path of the tone signal reception part (the tone switch 1139) and the hook switch control signal for switching ON and OFF the hook switch 112 are transmitted from the integrated circuit 115 on the modem and main control part side to the integrated circuit 113 on the network side via a common transmission line also used for the facsimile data, that is, the capacitor 114b, of the insulation part 114. Therefore, the configuration of the insulation part 114 can be simplified.

Next, as a result of the detection of the tone signal such as the CNG signal, the facsimile data transmitted from the network 2 is received. With the CML relay 110 being OFF, the hook switch 112 being ON, and the tone switch 1139 being OFF, the facsimile reception data transmitted from the network 2 is supplied to the main body of the facsimile machine 1 via the diode bridge 111, the current sensor 1130 and the hook switch 112, the hybrid network 1133, the reception amplifier 1134a, the CODEC 1135, the insulation I/F 1136, the capacitor 114a of the insulation part 114, the insulation I/F 1150, the TX/RX I/F 1151, and the modem 12 as indicated by the broken line in FIG. 8.

Figure 8:
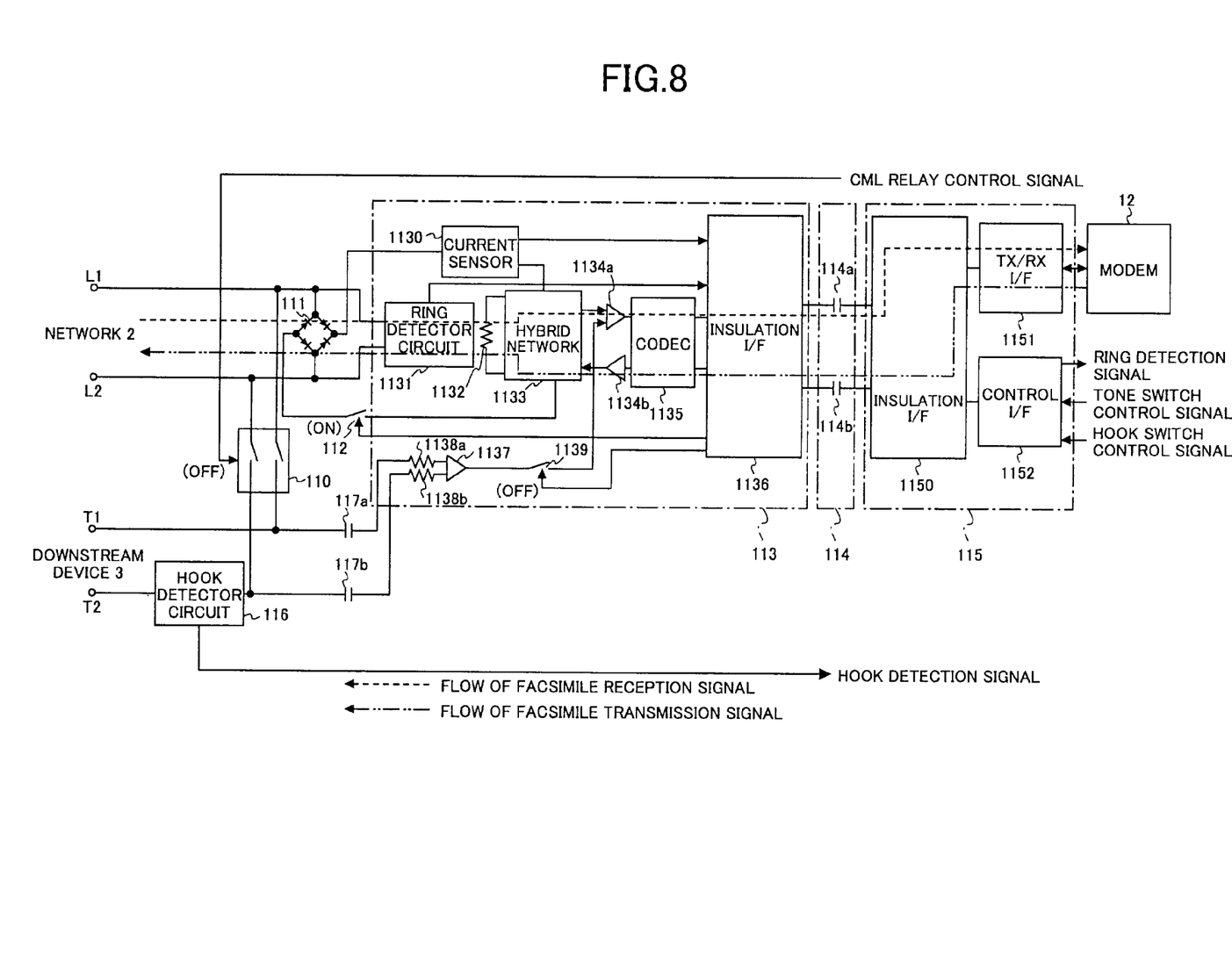
FIG. 8 is a diagram showing paths through which facsimile data is transmitted and received according to the present invention.

On the other hand, the facsimile transmission data, with the CML relay 110 being OFF, the hook switch 112 being ON, and the tone switch 1139 being OFF, is transmitted to the network 2 via the modem 12, the TX/RX I/F 1151, the insulation I/F 1150, the capacitor 114b of the insulation part 114, the insulation I/F 1136, the CODEC 1135, the transmission amplifier 1134b, the hybrid network 1133, the current sensor 1130 and the hook switch 112, and the diode bridge 111 as indicated by the double-dot chain line arrow in FIG. 8.

The above description is given of the case where the CODEC 1135 is provided in the integrated circuit 113 on the network side as shown in FIG. 3, while the present invention is also applicable in the case where the CODEC 120 is provided in the modem 12 as shown in FIG. 4 (or in the integrated circuit 115 on the modem and main control part side) as in the case of FIG. 3.

In the case of FIG. 4, since the CODEC 120 is provided in the modem 12, the insulation part 114 performs analog transmission. Accordingly, analog photocouplers 114a' and 114b' are employed as the high insulation elements of the insulation part 114, the integrated circuit 113 on the network side lacks the insulation I/F 1136 of FIG. 3 so that the reception amplifier 1134a directly receives and the transmission amplifier 1134b directly transmits the data and signals, and a reception amplifier 115a and a transmission amplifier 115b are provided in the integrated circuit 115 on the modem and main control part side so as to receive and transmit the data and signals, respectively. The configuration of FIG. 4 is specifically different from that of FIG. 3 in the above-described respects.

However, the facsimile machine 1 can produce the same effects in the case of having the CODEC 120 provided in the modem 12 as shown in FIG. 4 as in the case of FIG. 3.

The present invention is not limited to the specifically disclosed embodiment, but variations and modifications may be made without departing from the scope of the present invention.

The present application is based on Japanese priority application No. 2001-238212 filed on Aug. 6, 2001, the entire contents of which are hereby incorporated by reference.

What is claimed is:

1. A facsimile machine having a semiconductor DAA provided in a line I/F part performing facsimile data communication with a network, the facsimile machine comprising:
   a tone signal reception part in the form of a semiconductor device, the tone signal reception part being provided in the semiconductor DAA and receiving a tone signal with high impedance through a path different from a path for receiving the facsimile data, the tone signal being supplied from the network or a downstream device.

2. The facsimile machine as claimed in claim 1, wherein: the semiconductor DAA comprises:
   a first circuit part on a side of the network;
   a second circuit part on a side of a modem and a main control part; and
   an insulation part coupling the first and second circuit parts; and
   said tone signal reception part is provided in said first circuit part.

3. The facsimile machine as claimed in claim 2, wherein the tone signal received by said tone signal reception part is transmitted to said second circuit part through a transmission line of said insulation part, the transmission line being also used for the facsimile data.

4. The facsimile machine as claimed in claim 3, wherein the transmission line of said insulation part comprises one of a capacitor and a photocoupler.

5. The facsimile machine as claimed in claim 2, wherein the semiconductor DAA further comprises a coder-decoder performing A/D and D/A conversion on the facsimile data, the coder-decoder being provided in one of said first circuit part, said second circuit part, and the modem.

6. The facsimile machine as claimed in claim 2, further comprising a switch for switching on and off a path of said tone signal reception part for transmitting the tone signal, the switch being provided in the semiconductor DAA.

7. The facsimile machine as claimed in claim 6, wherein a control signal for controlling switching of said switch is transmitted from said second circuit part through a transmission line of said insulation part, the transmission line being also used for the facsimile data.

8. The facsimile machine as claimed in claim 7, wherein the transmission line of said insulation part comprises one of a capacitor and a photocoupler.

9. The facsimile machine as claimed in claim 7, further comprising a control part controlling the entire facsimile machine,
   wherein the control signal for controlling switching of said switch is generated by said control part.

10. The facsimile machine as claimed in claim 7, wherein the control signal controls said switch so that said switch is switched on except for during facsimile communication and is switched off when facsimile communication is started.

11. The facsimile machine as claimed in claim 1, further comprising a part performing switching from telephone to facsimile,
    wherein said tone signal reception part receives a CNG signal indicating facsimile communication.

12. The facsimile machine as claimed in claim 1, further comprising a part providing facsimile communication network service,
    wherein said tone signal reception part receives an FCC signal that is a call signal of the facsimile communication network service.

13. The facsimile machine as claimed in claim 1, further comprising a part performing remote switching from telephone to facsimile,
    wherein said tone signal reception part receives a DTMF signal that is a remote number of a switching signal.

14. The facsimile machine as claimed in claim 1, further comprising:
    a first part performing switching from telephone to facsimile;
    a second part providing facsimile communication network service; and
    a third part performing remote switching from telephone to facsimile,
    wherein said tone signal reception part receives a CNG signal indicating facsimile communication, an FCC signal that is a call signal of the facsimile communication network service, and a DTMF signal that is a remote number of a switching signal.

15. The facsimile machine as claimed in claim 1, further comprising a switch for switching on and off a path of said tone signal reception part for transmitting the tone signal, the switch being provided in the semiconductor DAA.

16. The facsimile machine as claimed in claim 1, wherein said tone signal reception part comprises:
    a differential amplifier; and
    resistors connected to said differential amplifier,
    wherein said differential amplifier has inputs connected to the network or a downstream device via said resistors, and produces an output signal that is a function of a difference between said inputs.

17. The facsimile machine as claimed in claim 1, further comprising:
    a control part controlling the entire facsimile machine in accordance with control programs stored in a memory part;
    a recording part printing the received facsimile data on a recording medium; and
    an operation part specifying an operation to be performed by the facsimile machine.

* * * * *